United States Patent
Clement et al.

Patent Number: 5,511,426
Date of Patent: Apr. 30, 1996

[54] PROCESS AND DEVICE FOR MEASURING OPERATING TURBINE BLADE VIBRATIONS

[75] Inventors: Michel Clement, Vernon; Jacky Rouhet, St Marcel, both of France

[73] Assignee: Societe Europeenne de Propulsion, Suresnes, France

[21] Appl. No.: 116,357

[22] Filed: Sep. 2, 1993

[30] Foreign Application Priority Data

Sep. 3, 1992 [FR] France .................................. 92 10536

[51] Int. Cl.$^6$ ................................................. G01H 9/00
[52] U.S. Cl. ............................................. 73/655; 73/660
[58] Field of Search ...................... 73/655, 660, DIG. 1, 73/455, 460

[56] References Cited

U.S. PATENT DOCUMENTS

| | | | |
|---|---|---|---|
| 4,080,823 | 3/1978 | Stargardter | 73/655 |
| 4,109,532 | 8/1978 | Donato | 73/457 |
| 4,573,358 | 3/1986 | Luongo | 73/660 |

FOREIGN PATENT DOCUMENTS

| | | | |
|---|---|---|---|
| 0320122 | 6/1989 | European Pat. Off. . | |
| 236827 | 11/1969 | U.S.S.R. | 73/660 |
| 1562710 | 5/1990 | U.S.S.R. | 73/660 |

OTHER PUBLICATIONS

"Measuring Vibration on Turbine Blades by Optical Means", H. Roth, Baden, Brown Boveri Review, vol. 64, No. 1, Jan. 1977, pp. 64–67.

"Une Mesure Optique Des Amplitudes de Vibration Tres Faibles", Mesures Regulation automatisme, vol. 43, No. 6/7, Jul. 1978, Paris, France, pp. 21–22.

*Primary Examiner*—Hezron E. Williams
*Assistant Examiner*—Christine K. Oda
*Attorney, Agent, or Firm*—Weingarten, Schurgin, Gagnebin & Hayes

[57] ABSTRACT

A process and a device for the optical measurement of vibrations of rotating turbine blades moving with a specified speed of rotation. In one embodiment, the process comprises the steps of generating three reference signals in response to the detection, by an optical detector, of the passing of a marking made on the hub of a turbine wheel; detecting measurement signals, by another optical detector, in response to the passing of another marking made on at least one of the parts of a turbine blade, the blade undergoing oscillation; determining the time offsets existing between each of the reference signals and each of the measurement signals, these offsets being, in the absence of oscillations of the blade, zero or equal to specified constant values; and calculating the amplitude, frequency and phase components of blade vibration from the various offsets recorded.

37 Claims, 9 Drawing Sheets

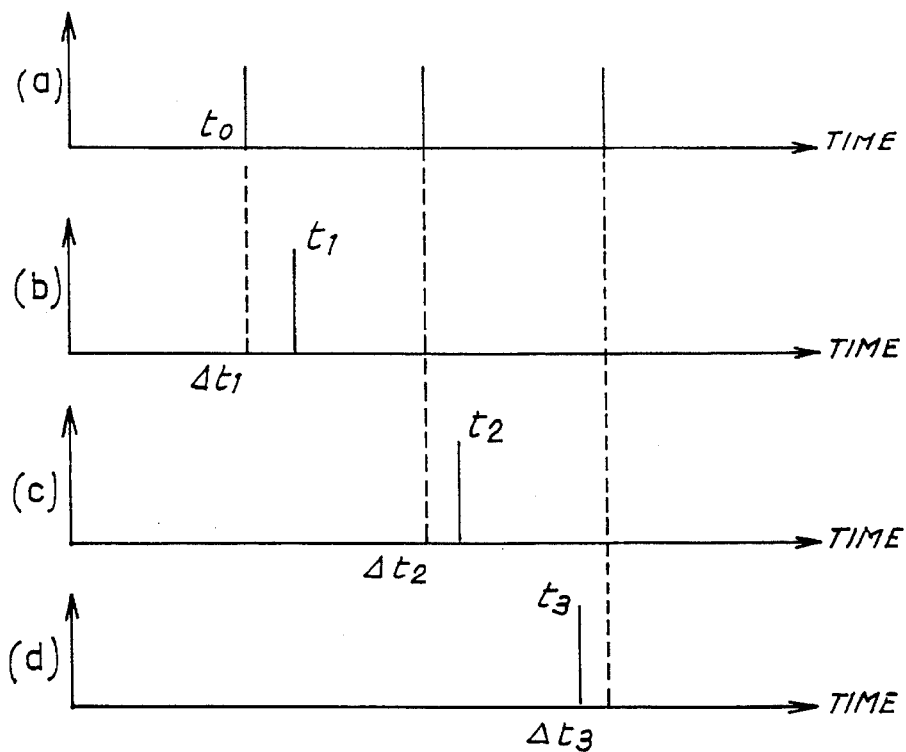
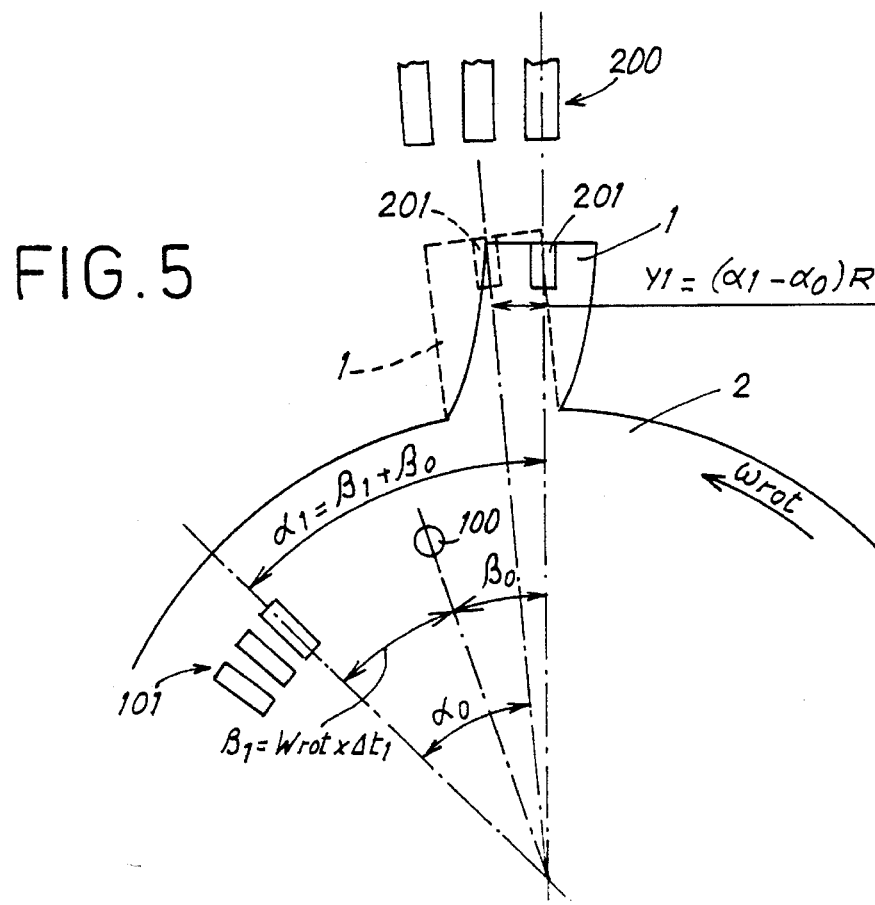

PROCESS AND DEVICE FOR MEASURING OPERATING TURBINE BLADE VIBRATIONS

FIELD OF THE INVENTION

The present invention relates to a process for optical measurement of vibration of turbine blades irrespective of their shape and size, the turbine being operational. This process can be applied in regard to all types of turbines, gas turbines or hydraulic turbines for example.

The present invention also concerns the device for implementing this process for contactless optical measurement.

PRIOR ART

A device for optical measurement of the displacements of propeller blades implementing a laser source is known through the article by Anatole P. KURKOV entitled "Optical Measurement of Unducted Fan Blade Detections" published in the journal of "The American society of mechanical engineers" (ref.: 89-GT-298), the principle of measurement of the displacements relying upon the occluding, by the blades of the propeller, of the light beam arising from the laser source.

This method of measurement has a number of disadvantages and in particular that of not allowing the determination of all the parameters characteristic of the vibration of the blade, namely its amplitude, frequency and phase, but only one of them, its amplitude. Furthermore, such a method provides access merely to an average value of the displacement, calculated from the measurements on all the blades and over several revolutions.

Moreover, the use of a laser source, through the bulkiness which it entails, does not allow miniaturization of the measurement system which, in the case of turbines of small size and of difficult accessibility, such as low-power turbopump turbines for example, may prove to be indispensable.

SUBJECT AND BRIEF DESCRIPTION OF THE INVENTION

The purpose of the present invention is to provide a process which allows instantaneous determination, in real time, of all the components of the vibration of the blade. Its purpose is also to produce a simple and reliable device for optical measurement, of particularly compact size, adaptable to all types of turbines and insensitive to the surrounding media.

These purposes are achieved by a process for optical measurement of vibrations, especially of rotating turbine blades, these blades being mounted on a hub integral with the shaft of the turbine wheel and each including at least one flank disposed in a plane parallel to the midplane of the hub and a topside disposed in a plane parallel to the tangent plane of the hub, characterized in that, with the wheel moving with a specified constant speed of rotation, it includes the following steps:

generation of three reference signals from detection of the passing of a marking, made on the hub of the turbine wheel, through an optical detector, detection of measurement signals on the passing of another marking, made on at least any one of the parts of the blade, in front of another optical detector, the blade undergoing oscillation, determination of the time offsets existing between each of the reference signals and each of the measurement signals, these offsets being, in the absence of oscillations of the blade, zero or equal to specified constant values, and instantaneous calculation of the amplitude, frequency and phase components of blade vibration from the various offsets recorded.

The signals generated with each revolution allow the calculation of three instantaneous values of the displacement of the blade (time offsets) due to the resonant vibration of the latter in one of the natural vibration modes of the blade, that is to say the tangential vibration mode, the transverse mode or the torsional mode. These three values then allow, through the solution of a system of three equations in three unknowns, calculation of the three characteristic components of this vibration, namely: its amplitude, frequency and phase.

For the determination of the components of the tangential vibration, the marking can be made on the flank of the blade in the form of three radially disposed equidistant marks, and the detector is a single sensor placed perpendicularly to the plane of the hub ahead of the blades.

This marking can also be produced simply by the edge of the blade, the detector then consisting of three equidistant sensors disposed ahead of the blades perpendicularly to the plane of the hub.

For the determination of the components of the transverse vibration, the marking is made on the topside of the blade in the form of three parallel marks disposed obliquely with respect to the axis of the wheel, and the detector is a single radial sensor disposed in the midplane of the wheel on top of the blade.

According to another embodiment, this marking (301) is made on the topside of the blade in the form of three diamonds whose smallest diagonals are disposed in the midplane of the wheel, and the detector consists of two sensors separated by a specified distance d and situated on either side of the midplane of the wheel.

For the determination of the components of the torsional vibration, the marking is made on the topside of the blade in the form of three parallel marks disposed parallel to the axis of the wheel, and the detector is a single radial sensor situated at a specified distance r from the midplane of the wheel.

According to another embodiment, this marking may consist of a single mark disposed on the topside of the blade parallel to the axis of the wheel, and the detector then consists of three equidistant radial sensors situated in a plane parallel to the midplane of the wheel at a specified distance r from the latter plane.

A simultaneous determination of the transverse and torsional modes is possible by adopting a configuration such that the marking is made on the topside of the blade in the form of three isosceles triangles whose bases are disposed parallel to the axis of the wheel, and the detector consists of two sensors separated by a specified distance d and situated on either side of the midplane of the wheel.

The measurement of the vibrations of all the blades of a turbine is possible with an analysis of all the blades in one wheel revolution or an analysis of a new blade with each revolution.

In order to complete the information available about these vibrations, a Fourier analysis can be carried out later to determine the spectrum of these vibrations. Similarly, in order to increase the accuracy of the recorded measurements, a determination of the axial displacements of the wheel can be performed by recording the variations of the amplitude of the reference signals with respect to a specified initial amplitude.

The device for the implementation of this process includes:
- a first measurement system for the generation of three reference signals from the detection, by a first detector, of the passing of a first marking made on the hub of the turbine wheel,
- a second measurement system for the detection of three measurement signals on the passing of a second marking, made on the flank of the blade, in front of a second detector, the blade undergoing oscillation.

In this configuration, only the tangential vibrations can be measured. For the measurement of the transverse and torsional vibrations it is necessary to append a third and then a fourth measurement system which are analogous to the second measurement system but are placed on the topside of the blade.

However, in a particular embodiment, three measurement systems are sufficient to measure all the vibration modes, the third measurement system then being such that the marking consists of three marks in the form of isosceles triangles whose bases are parallel to the axis of the wheel and the said third detector consists of two radial sensors situated, on top of the blade, on either side of the midplane of the wheel and separated by a specified distance d.

In practice, the detection of the passing of a marking is carried out by occluding or reflecting a light beam arising from a source and terminating at the optical detector.

According to a particular embodiment, the source and the detector are conveyed from the place of measurement by means of a single optical fibre, a beam splitter affording a routing on transmission and on reception.

The optical signals provided by the detectors are transformed into digital signals in an opto-electronic acquisition module and a signal processing module derives the parameters of the vibration therefrom. The acquisition module includes feed and reception modules for generating the measurement light beam and receiving the reflected or transmitted beam and modules for shaping the digital signals arising from the optical signals.

The signal processing module includes a module for determining the speed of rotation of the turbine wheel from the reference signals received by the acquisition module, a time resetting circuit for taking into account the initial offsets existing at the level of the measurement systems, and a real-time calculating unit which, from the measured time offsets provided by the acquisition module and realigned, calculates the parameters of the vibration which are its amplitude, frequency and phase in each mode.

BRIEF DESCRIPTION OF THE DRAWINGS

Other characteristics and advantages of the present invention will emerge more clearly from reading the following description given, by way of illustrative and non-limiting example, in connection with the attached drawings in which:

FIG. 4 shows some of the signals received by the acquisition module, FIG. 5 is a diagram explaining the determination of the tangential displacement of a blade.

DETAILED DESCRIPTION OF PARTICULAR EMBODIMENTS

Figures 1, 2:
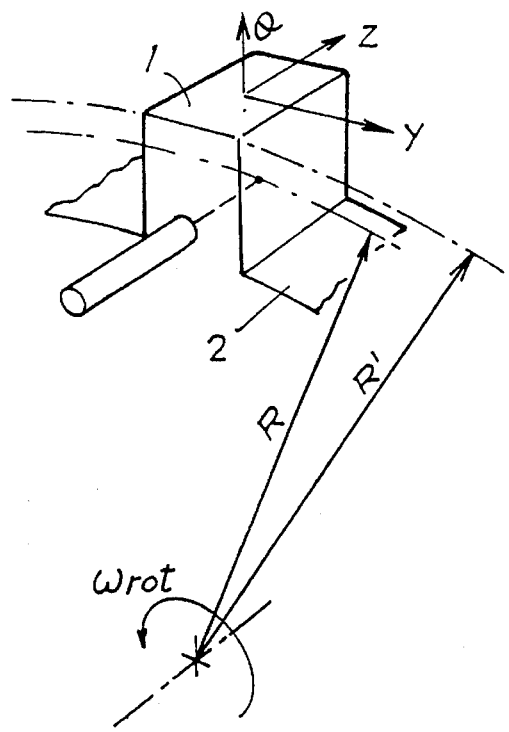
FIG. 1 shows the three possible modes of vibration of a blade.
FIG. 2 is a diagram of installation of the device for optical measurement of vibration according to the invention.

FIG. 1 represents a turbine blade in which the various modes of vibration of the blade have been depicted.

The blade 1 is a kind of reed which can vibrate at an eigenfrequency which depends on its shape, on its size and on its mode of fixing to the hub 2. Three modes of vibration of this blade can be distinguished: a tangential mode of vibration (along the axis labelled y), a transverse mode of vibration (along the axis labelled z) and a torsional mode of vibration (along the axis labelled θ).

The vibration of the blade in each of these modes characterized by its frequency, amplitude and phase, parameters which it is important to know well in order to evaluate as accurately as possible the risks of failure of the blade and hence avoid this failure, which is prejudicial to the turbine, but also to the apparatus in which the latter is incorporated.

If the three aforesaid modes are regarded as intervening simultaneously, the displacement of the blade resulting from this combined vibration is then given by the following general equations:

$$y = A_y \cos\left[ \omega_y \left[ t + \frac{KA_z}{\omega_{rot} R} \cos[\omega_z t + \phi_z] + \frac{\epsilon A\theta}{\omega_{rot} R} \cos[\omega_\theta t + \phi_\theta] \right] + \phi_y \right]$$

$$z = A_z \cos\left[ \omega_z \left[ t + \frac{A_y}{\omega_{rot} R'} \cos[\omega_y t + \phi_y] \right] + \phi_z \right]$$

$$\theta = A_\theta \cos\left[ \omega_\theta \left[ t + \frac{A_y}{\omega_{rot} R'} \cos[\omega_y t + \phi_y] \right] + \phi_\theta \right]$$

in which:
$\omega_{rot}$ is the angular speed of rotation of the hub
R is the radius of the locus of the point of measurement of flexion along the y axis
R' the radius of the edge of the blade
Ay, Az, Aθ the amplitudes of the vibrations along the y, z and θ axes respectively
ωy, ωz, ωθ the amplitudes of the vibrations along the y, z and θ axes respectively φy, φz, φθ, the phases of the vibrations along the y, z and θ axes respectively K and ε the inter-mode coupling coefficients.

In fact, in practice, the three modes are not excited simultaneously, so that the modes interfere with one another little or not at all. Indeed, when one of the modes enters into resonance, it becomes predominant and the other two modes are then measurable with difficulty.

Thus, assuming that the tangential mode of vibration alone is excited, the aforesaid equations reduce to (Az and Aθ being negligible):

$$y \approx A_y \cos [\omega_y t + \phi_y]$$

$$z = 0 \text{ for } \omega_{rot}^{(1)}$$

$$\theta \approx 0$$

If the other 2 modes z and θ are small but nevertheless measurable, they obey the 2 above general equations giving z and θ and into which will have been introduced the values $A_y$, $\omega_y$ and $\phi_y$ calculated from the measurement of flexion along y.

For a different speed of rotation of the hub, resonance may occur for a different mode of vibration, for example transverse, and the general equations will then become:

$$y \approx 0$$

$$z \approx A_z \cos [\omega_z t + \phi_z] \text{ for } \omega_{rot}^{(2)}$$

$$\theta \approx 0$$

and similarly for resonance in the torsional mode of the blade $$y \approx 0$$

$$z \approx 0 \text{ for } \omega_{rot}^{(3)} = \omega_{rot}^{(2)}$$

$$\theta \approx A\theta \cos [\omega_\theta t + \phi_\theta]$$

FIG. 2 is a diagram of installation of the device for optical measurement of vibration according to the invention. This device includes a first measurement system 10 intended to deliver reference signals generated by a first optical detector 100 with the passing of a reference marking 101 recorded on the hub 2 of the turbine wheel. It also includes second 20, third 30 and fourth 40 measurement systems intended to deliver tangential, transverse and torsional vibration measurement signals respectively, generated by second 200, third 300 and fourth 400 optical detectors with the passing of the second 201, third 301 and fourth 401 markings. The reference and measurement signals delivered by the respective optical detectors are brought to an opto-electronic acquisition module 50 which transforms the optical signals from the detectors into digital signals which can be handled by a signal processing module 60 which, from these signals, determines in real time the parameters of the vibrations in each of the modes.

Figure 3:
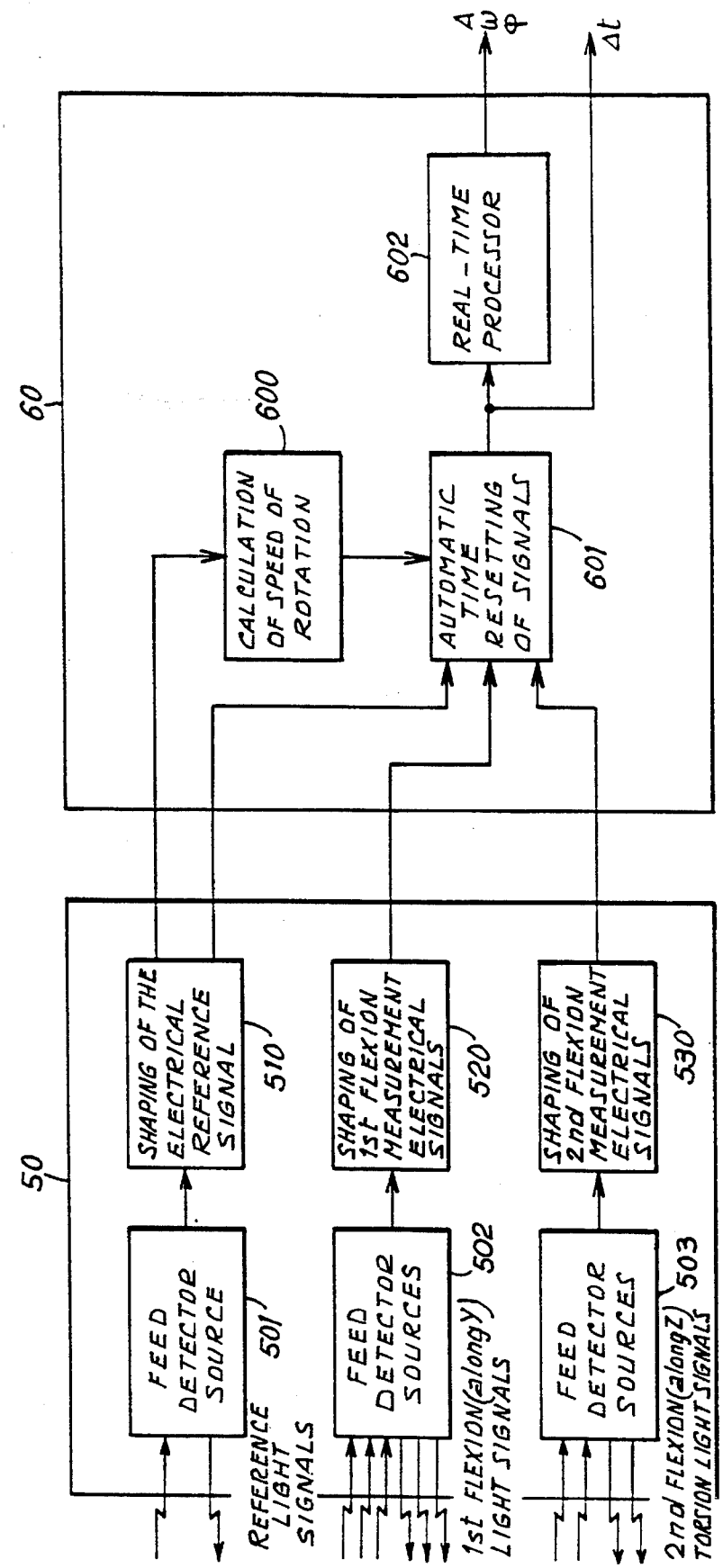
FIG. 3 shows the opto-electronic measuring chain of the device of FIG. 2.

FIG. 3 shows the structure of the opto-electronic measurement chain in greater detail. The acquisition module 50 includes feed and reception modules 501, 502, 503 which afford, for each measurement system, both the generation of the light beam and the reception of the optical signals emitted by the detectors.

Circuits 510, 520, 530 for shaping the electrical signals arising from these optical signals complete this acquisition module.

The signal processing module 60 includes a module 600 for determining the speed of rotation of the turbine wheel from the reference signals delivered by the first measurement system 10 and received by the acquisition module 50, a circuit 601 for automatic time resetting of the measurement signals and a real-time calculating unit 602 which determines the vibratory parameters A, ω, φ characteristic of the vibration mode(s) detected, from time offsets provided by the circuit 50 after possible resetting of the latter.

The purpose of the resetting circuit 601 is to take into account the time offsets of the several signals, existing initially, and due in particular to the positioning tolerances of the various optical detectors. These initial offsets are recorded at slow speed, in the absence of any vibration of the blades, during a parameter acquisition phase and are then compared automatically during measurement.

It is important to note that, at the level of the circuit 601, the raw time signals Δt are available, the latter enabling later processing, for example statistical, of the various measurements to be carried out.

We return to FIG. 2 in which may be observed the various markings implemented in the invention.

The reference marking 101 consists preferably of three equidistant radial marks made on the hub of the wheel of the turbine substantially at the root of the blades. However, this marking is not obligatory and it is possible to make just a single mark on the hub, the detector 100 then consisting of three sensors placed side by side equidistantly. In either case, the first measurement system 10 will deliver three reference signals corresponding to the passing either of each mark in front of a single sensor or of a single mark in front of three distinct sensors.

The tangential vibration measurement marking 201 consists advantageously of a single mark placed radially on the flank of the blade. However, here again, this presentation is not the only one possible. This mark can, for example, consist simply of the edge of the blade. Similarly, as before, three equidistant radial marks can be made. The second detector 200 placed ahead of the blades will then comprise a single sensor and not three as represented.

Irrespective of the configuration adopted, the second measurement system 20 will deliver three measurement signals corresponding to the passing either of the single mark or of one edge of the blade in front of three distinct sensors or of three marks in front of a single sensor.

It should be noted that the angles between the reference marks and the measurement sensors must be identical.

The transverse and torsional vibration measurement marking 301, 401 stems from the same principle and will therefore not be detailed. It can simply be noted that this marking is made on the topside of the blade and not on the flank, and that for reasons of sizing the option with three marks, parallel to the axis of the wheel (torsional mode) or inclined with respect to this axis (transverse mode) and a single sensor disposed radially is preferable, without however excluding, in certain particular cases, the other two options (multiple sensors or blade edge) which may be possible.

FIG. 4 shows the various signals delivered at the level of the acquisition module 50 for a given mode of vibration, for example the tangential mode of vibration. At a) are shown the signals recorded by the first measurement system 10, at b), c) and d) the signals recorded at the level of each sensor of the second measurement system 20.

When there is no vibration, the times of appearance of the reference signals coincide with those of the measurement signals. However, when there is a vibration (tangential for the example analyzed), the blades are no longer normal to the hub and there is then a phase shift between detection of the references on the hub by the first measurement system 10 and detection of the marks on the flank of the blade by the second measurement system 20. This phase shift is depicted by three specified time offsets $\Delta t_1$, $\Delta t_2$, $\Delta t_3$ with respect to the time of appearance of the corresponding reference signal.

FIG. 5 is a diagram explaining the determination of the displacement of the blade in the tangential mode of vibration from a knowledge of the times of passage of the marks in front of the sensors (the principle of this determination is analogous for the other two modes).

Blade 1 is represented both at rest (dashed line) and under vibration. The single reference sensor 100 is fixed and disposed parallel to the axis of the wheel, ahead of the hub. The reference marking 101 consists of three equidistant marks made on the hub 2. The system 20 for measuring the tangential vibration consists of a single mark 201 made on the flank of the blade and three fixed sensors 200 disposed ahead of the blades parallel to the axis of the wheel and on an arc of a circle having this axis as centre. The angles between the three reference marks and the three measurement sensors are identical. Two characteristic constants will be noted, one $\alpha_0$ tied to the hub and representing the angle between marks and the other $\beta_0$ tied to the casing on which the sensors are mounted and corresponding to the angle between sensors. It will be assumed that the wheel rotates at a specified speed $\omega_{rot}$.

At time $t_0$, the first mark on the hub 2 is passed in front of the reference sensor 100, but owing to the vibration of the blade the first measurement sensor does not detect the passage of the mark on the flank of the blade until a later time $t_1$. Let $\Delta t_1$ be the offset between $t_0$ and $t_1$, we can write:

$$y_1 = R\, \omega_{rot}\, \Delta t_1 + R(\beta_0 - \alpha_0)$$

with R the radial position of the fixed measurement sensors 200 with respect to the axis of rotation of the wheel.

In order to simplify the calculations it would be possible to seek to make $\alpha_0$ and $\beta_0$ identical, but in practice these values will be introduced as setting values their determination being the job of the resetting module 601 mentioned earlier.

The determination of three time offsets $\Delta t_1$, $\Delta t_2$, $\Delta t_3$, will make it possible to obtain three values $y_1$, $y_2$, $y_3$ of the displacement of the blade at the times $t_1$, $t_2$, $t_3$ (in the relevant mode of vibration) and hence to calculate the parameters of the vibration of the blade by applying the simplified equation defined earlier, namely:

$$y = A_y \cos(\omega_y t + \phi_y)$$

from which, we deduce simply:

$$\omega_{(A_y)} = \frac{\arccos Y_1/A_y - \arccos Y_2/A_y}{t_1 - t_2}$$

$$\phi_{(A_y)} = \arccos\left(\frac{y_3}{A_y}\right) - \omega t_3$$

a system whose numerical solution is particularly simple and known per se. It is essential to note that all these calculations are carried out instantaneously, in real time, without any storage other than that of the time offsets during the period for calculating the characteristic parameters of the vibration.

This real-time determination of the amplitude, frequency and phase of the vibration does not prohibit later analysis of the results, which will make it possible to obtain the spectrum of the vibration. To do this, the average period of rotation $\Delta T$ of one blade is measured over n revolutions and knowing this average period the variations $\Delta t_i$ corresponding to the oscillations of the blade will be measured. By performing statistics on a high number of revolutions, several hundred for example, and a Fourier analysis, the vibration spectrum of the blade is obtained, that is to say not only the fundamental frequency of the vibration but also its harmonics which, however, will be of fairly small amplitude.

Figure 6:
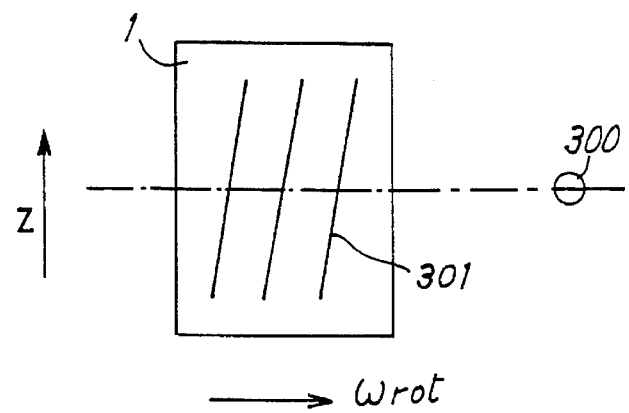
FIG. 6 is an illustrative disposition of the system for measuring the transverse vibration.
Figure 7:
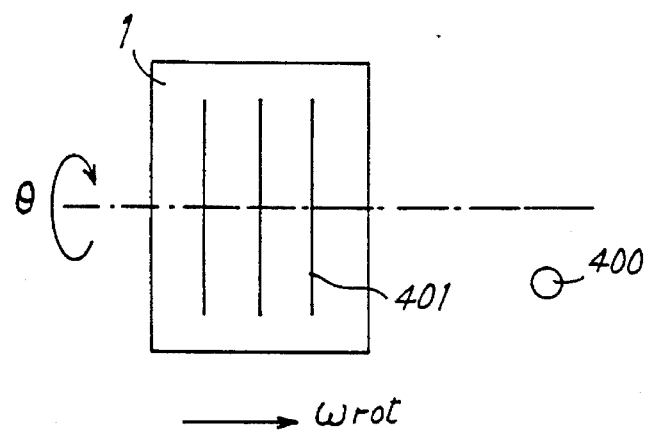
FIG. 7 is an illustrative disposition of the system for measuring the torsional vibration.

FIGS. 6 and 7 show the preferable dispositions of the sensors and of the markings made on the topside of the blade for the additional measurement of the vibrations in transverse mode and in flexural mode.

In the transverse mode of vibration, three parallel marks 301 are disposed obliquely with respect to the axis of the wheel and the single radial sensor 300 is placed in the axial plane of the blade (corresponding to the midplane of the wheel), this disposition allowing determination of the sense of the transverse displacement.

In the torsional mode of vibration, three parallel marks 401 are disposed parallel to the axis of the wheel and the single radial sensor 400 is placed at a distance r from the axis of the specified blade and obviously less than half a blade width.

Figure 8:
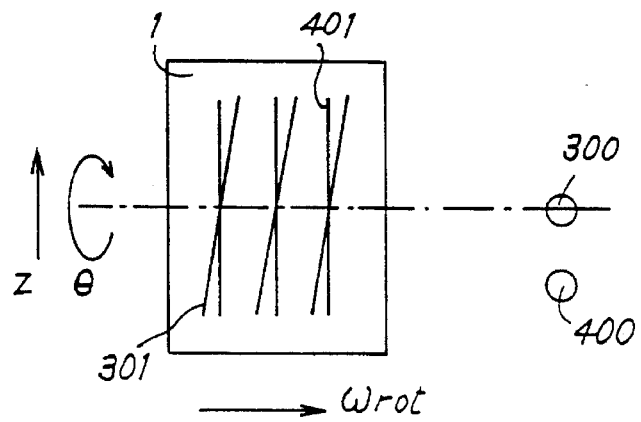
FIG. 8 is an illustrative disposition of the system for simultaneous measurement of the transverse and torsional vibrations.

FIG. 8 shows the marking adopted on the blade topside for measurement of the transverse and torsional vibrations together. This disposition combines the two previous ones with oblique marks 301 and marks 401 perpendicular to the direction of rotation, the sensors being placed, one on the axis of the blade, the other slightly off the axis by the distance r.

With this configuration for the transverse and torsional modes, the device according to the invention delivers fifteen measurement signals defined with respect to the three reference signals, establishing fifteen time offsets which make it possible to solve the aforesaid general equation system, which includes at most only 11 unknowns, and to which the vibration parameters are subjected.

This sizeable number of offset measurements can furthermore be reduced by adopting different configurations for the system for measuring the transverse and torsional modes, as will be shown in connection with FIGS. 9 to 11.

Figure 9A:
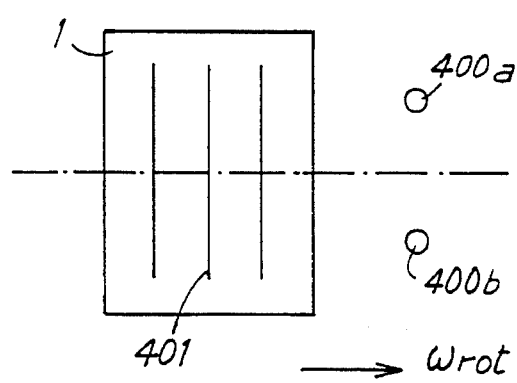
FIGS. 9a to 9c show another illustrative embodiment of the system for measuring the torsional vibration.
Figure 9B:
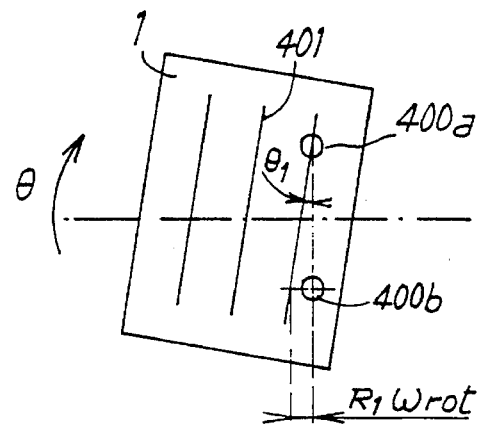
Figure 9C:
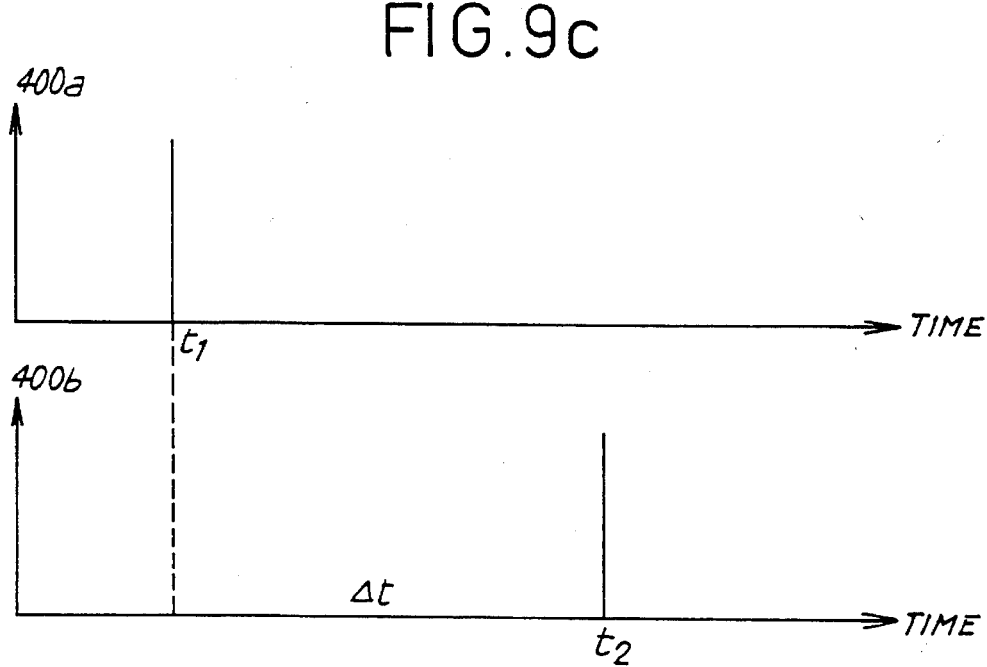

FIGS. 9a to 9c show a second illustrative embodiment of the fourth measurement system 40 for determination of the torsional vibrations.

This latter includes, as before, a marking 401 consisting of three parallel marks disposed parallel to the axis of the wheel, but the detector 400 is now formed by two radial sensors 400a and 400b disposed on either side of the axis of the blade 1 and separated by a specified distance d.

When there is no torsion (FIG. 9a), the pair of sensors 400a, 400b simultaneously detects the successive marks, and the times of appearance of these marks are coincident. By contrast, when there is torsion (FIG. 9b), the marks no longer pass in front of the two sensors at the same time.

Thus, for example, in FIG. 9c, it can be observed that it is sensor 400a which first detects, at $t_1$, the passing of the first mark, sensor 400b not producing this detection until time $t_2$. Let $\theta_1$ be the average torsional angle, it follows that:

$$\tan\theta_1 = \frac{R_1 \omega_{rot}(t_1 - t_2)}{d}$$

with $R_1$ the distance from the blade topside to the axis of the wheel and $\omega_{rot}$ the angular speed of rotation of the wheel.

i.e. $\theta_1 = \text{Arctan} \dfrac{R_1 \omega_{rot}}{d} \Delta t$ $\Delta t$ being the time offset between the passing of the same mark in front of the two sensors.

With three marks three measurements of torsional angle will be obtained, $\theta_1$, $\theta_2$, $\theta_3$, which are sufficient to determine the torsional vibration parameters, by a numerical method analogous to that mentioned earlier.

Figure 10A:
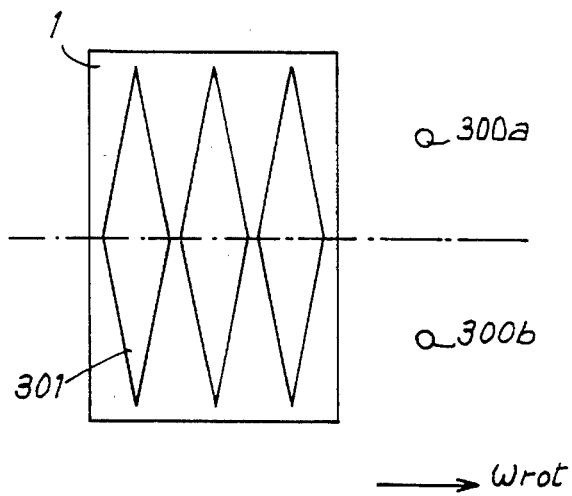
FIGS. 10a to 10c show another illustrative embodiment of the system for measuring the transverse vibration.
Figure 10B:
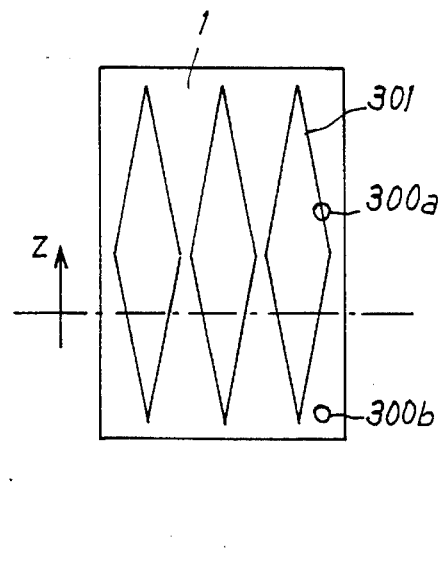
Figure 10C:
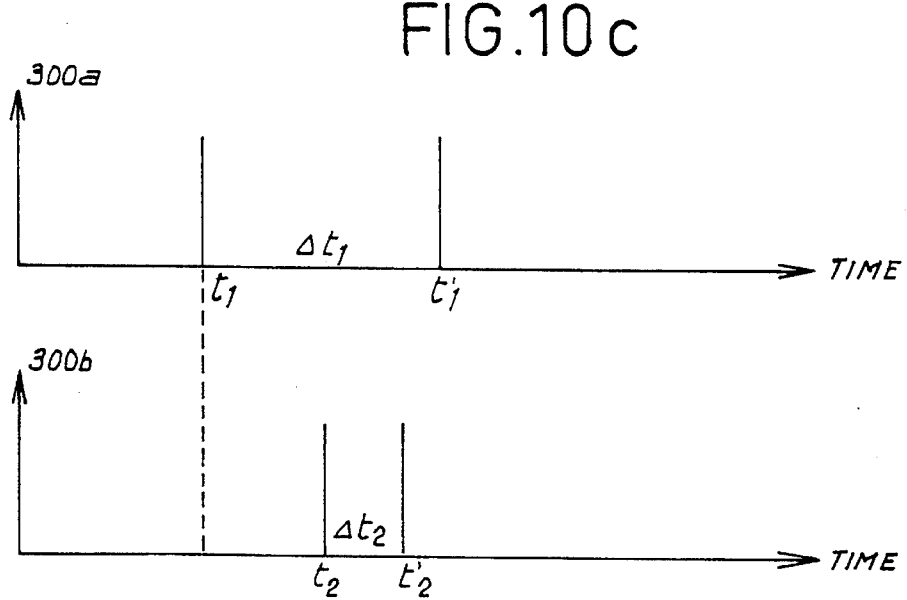
Figure 11A:
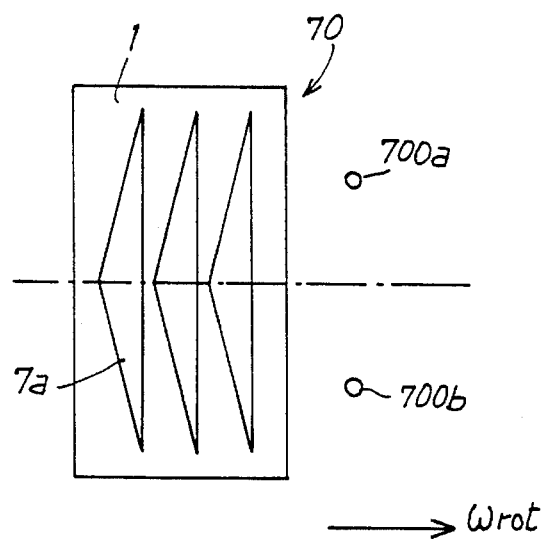
FIGS. 11a to 11c show another illustrative embodiment of the system for simultaneous measurement of the transverse and torsional vibrations.
Figure 11B:
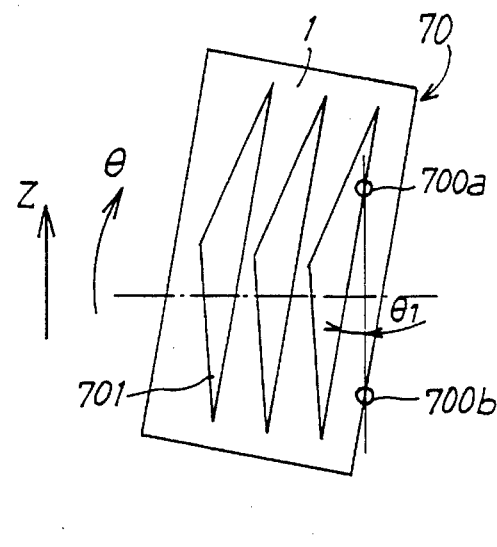

FIGS. 10a to 10c show a second illustrative embodiment of the third measurement system 30 for determination of the vibrations in transverse mode.

The latter includes a detector 300 formed of two radial sensors 300a and 300b disposed on either side of the axis of the blade 1 and separated by a specified distance d. It may be noted that this disposition of the sensors is analogous to the previous embodiment. By contrast, the marking 301 is distinct and consists of three marks in the shape of a diamond whose shortest diagonals are placed on the axis of the blade.

When there is no transverse flexion of the blade (FIG. 10a), the two sensors provide signals at the same times. By contrast, in the event of transverse flexion (FIG. 10b), the times of appearance of these signals with the passing of the mark no longer coincide.

Thus, for example in FIG. 10c, may be observed the detection at time $t_1$ by sensor 300a of a first flank of the first diamond-shaped mark, a second flank, on the other side of the axis, being detected by the second sensor 300b at time $t_2$. Then at times $t'_2$ and $t'_1$ come the detections of the opposite sides of the diamond. The time offsets $\Delta t_1 = t'_1 - t_1$ and $\Delta t_2 = t'_2 - t_2$ giving the thickness of the mark at the level of the passing of the sensors make it possible to recover the transverse displacement of the blade simply. It may be remarked that these marks could also consist of three "solid" diamonds, the time offsets then corresponding to a more or less brief duration of the signal received by each sensor.

FIG. 11 is another embodiment which allows the combining of the third and fourth measurement systems into a single measurement system 70 including two radial sensors 700a, 700b placed on top of the blades and affording both detection of the transverse vibration and that of the torsional vibration, and a marking 701 consisting of three isosceles triangles whose bases are parallel and disposed parallel to the axis of the wheel.

Figure 11C:
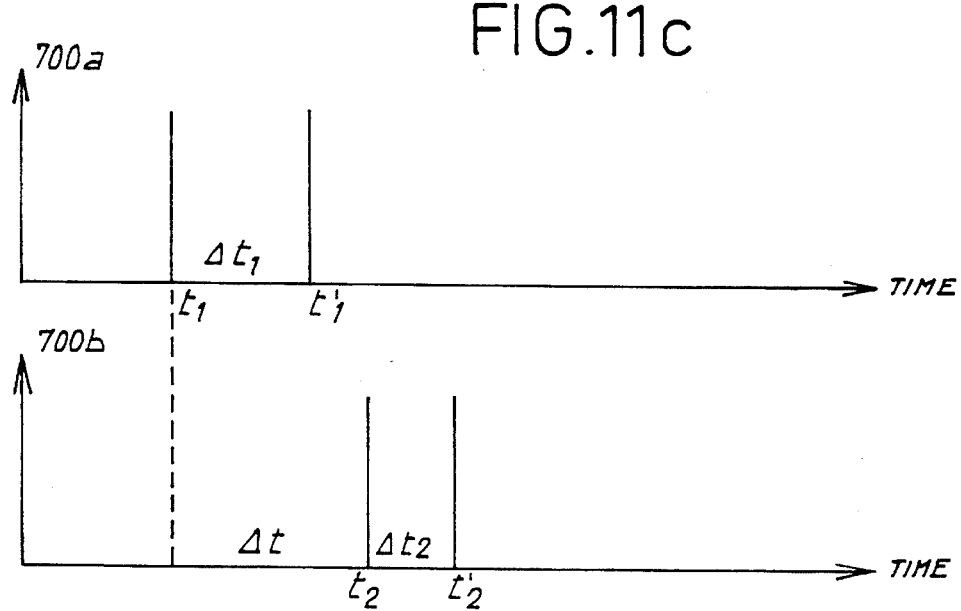

When no vibration is exerted on the blade (FIG. 11a), the times of detection of the starts (bases of the triangles) and end of marks (sides of the triangles) are identical for each sensor. By contrast, the appearance of a vibration (FIG. 11b) causes a non-coincidence of these times of appearance as shown in FIG. 11c. The time offsets $\Delta t_1$ and $\Delta t_2$ will make it possible to define the transverse vibration and the time offset $\Delta t$ existing between the time of detection of the bases of the triangles by the two sensors will make it possible to define the torsional vibration.

Indeed, the thicknesses of the triangular marks at the level of the passing of the sensors are given by:

$\Delta y_1 = R_1 \omega_{rot} \Delta t_1$ and $\Delta y_2 = R1 \omega_{rot} \Delta t_2$ The displacement of the blade along z, resulting from the transverse vibration alone, is then calculated by the expression:

$$z = \dfrac{\Delta y_2 - \Delta y_1}{2 \tan \alpha}$$

where $\alpha$ is the acute angle of the triangles.

It is interesting to note that with this particular disposition for the measurement of the transverse and torsional vibrations, the number of signals recorded for the measurement of all the vibrations is likewise equal to fifteen (4 signals per mark for the transverse and torsional vibrations and 3 signals for the tangential vibration), but the number of time offsets which can be used for determination of the vibration parameters is reduced to twelve.

It may also be remarked that the measurement of the displacement of the blade in the transverse mode of vibration is dependent on any variation of the axial position of the wheel. Also, it is preferable to correct the measurements in order to take this disturbance into account. This correction is done simply by determination of the amplitude of the reference signals with respect to a specified amplitude corresponding to a middle position of the wheel. This processing can be carried out at the level of the resetting module 601 for example.

FIGS. 12a to 12g represent various embodiments of the measurement systems 10 to 40. The latter vary according to the way in which the measurement light beam is created or transported. The light sources can be of any type, monochromatic or wideband and consist of laser sources or light-emitting diodes for example, with the sole condition that they emit continuously. In order to avoid possible interference between sources, it is advantageous to use light sources of different wavelengths associated preferably with narrow band detectors.

Figure 12A:
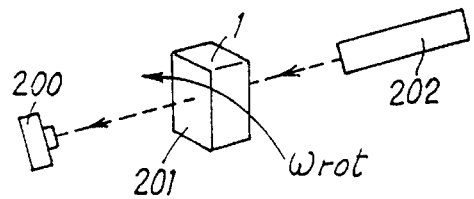
FIGS. 12a to 12g represent various configurations of the optical detector.

FIG. 12a is a diagrammatic representation of a system for measuring the tangential vibration 10 in which the marking 201 consists of an edge of the blade 1. The measurement is performed by occluding, with the blade, a light beam emitted by a source 202 heading for the detector 200.

Figure 12B:
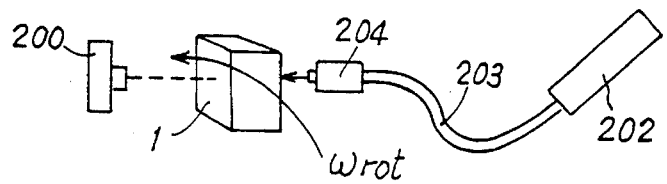

FIG. 12b is a diagrammatic representation of another system for measuring the tangential vibration 10 in which the marking 201 likewise consists of an edge of the blade but in which the light source 202 is conveyed by a first optical fibre 203 to a probe 204 situated near the blade and facing the detector 200.

Figure 12C:
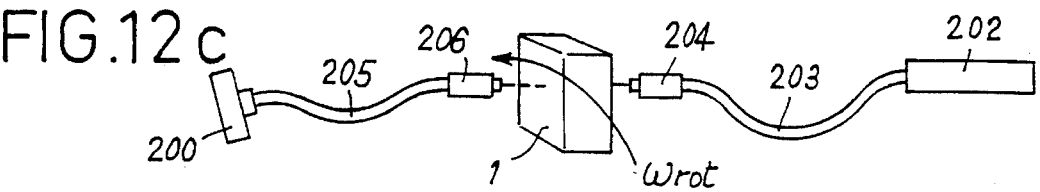

FIG. 12c is a diagrammatic representation of yet another system for measuring tangential vibration 10 in which the detector 200, like the source 202, is conveyed by optical fibre. A second probe 206 is placed end-on to the second optical fibre 205 connected to the detector 200.

Figure 12D:
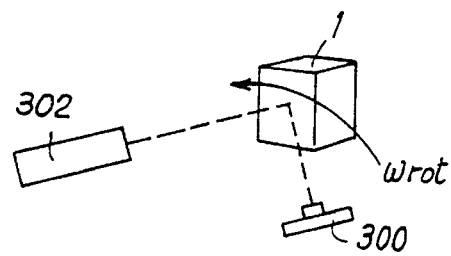

FIG. 12d is a diagrammatic representation of a measurement system applicable to the determination of any one of the vibrations, in which the measurement is performed by reflection on marks drawn on the blade, these marks possibly being reflective or on the contrary non-reflective, and the source and the detector (for example 302 and 300) being placed close to the blade.

Figure 12E:
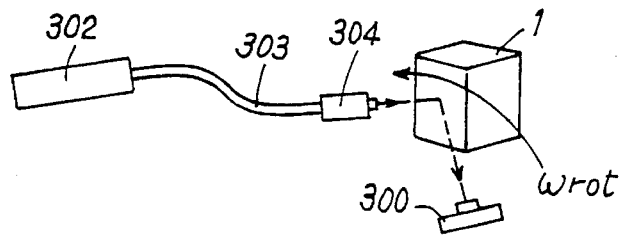

In FIG. 12e the light source is conveyed by a first optical fibre 303 terminating at a probe 304 opposite the blade.

Figure 12F:
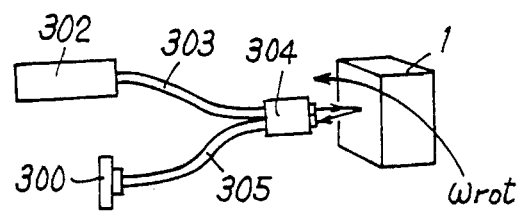

In FIG. 12f, it is the source and the detector which are likewise conveyed by two distinct optical fibres 303 and 305, the probe 304 being common.

Figure 12G:
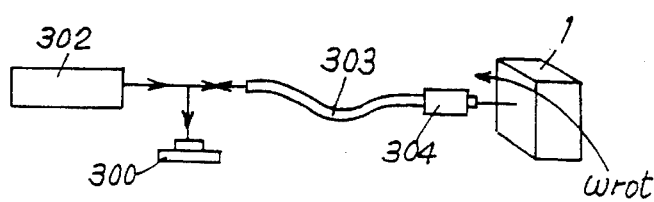

Finally, FIG. 12g shows diagrammatically a use of a single optical fibre which carries the information from the source 302 to the blade 1 and from the blade 1 to the detector 300, a beam splitter 307 allowing the routing of the information to the relevant element. In the case of the use of a single fibre, a focusing of the beam is possible by adjoining a lens, not represented, ahead of the fibre as close as possible to the blade.

Figure 13:
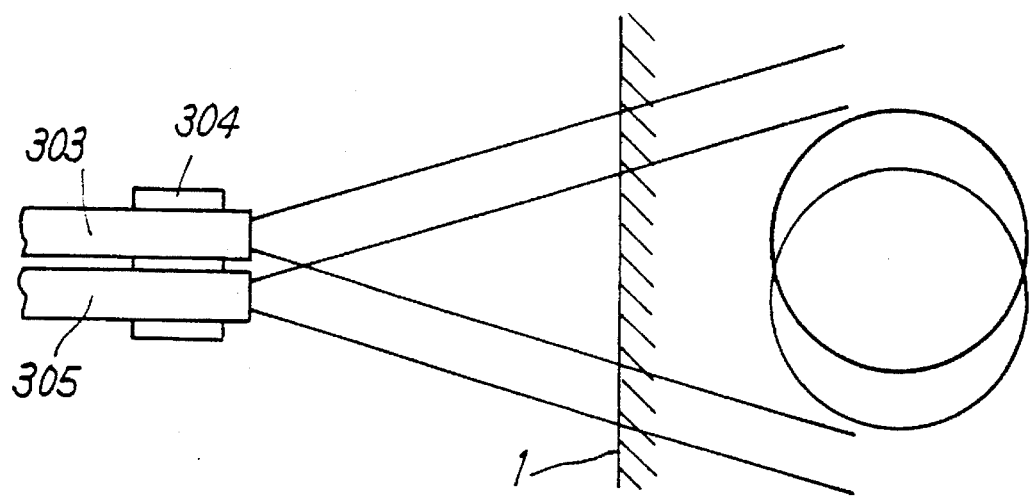
FIG. 13 is a detail view of the action of the light beam on one face of the blade.

FIG. 13 shows in greater detail the impact of the light beam from the source and its reflection on the blade in the embodiment of FIG. 12f.

The light arising from the emitting fibre 303 is contained in a cone defined by its numerical aperture. This provokes at the level of the illuminated object, that is to say a flank or the topside of the blade 1, a substantially constant lighting over a circular area whose diameter grows with the fibre/ blade distance.

The light received by the blade is scattered back towards the receiving fibre 305 and then guided by the latter to the photodetector 300.

The emitter and the receiver are conveyed in the opto-electronic feed and acquisition module 501, 502, 503.

Figure 14:
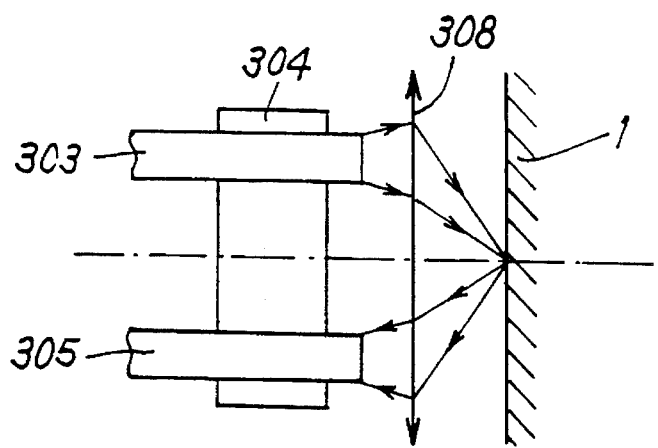
FIG. 14 shows the transformation of the impact of the light beam on the blade through the use of a focusing lens.

It may be noted, as shown in FIG. 14, that a lens 308 can be disposed at the exit of the emitter 304 and receiver 305 fibres so as to focus the light beam at a precise point of the blade.

These multiple dispositions of the measurement systems make it possible to afford very great flexibility to the device according to the invention which may be miniaturized and thus to allow measurements under conditions of difficult accessibility. The use of optical means desensitizes the device in particular to electromagnetic variations and allows measurements irrespective of temperature, very low or high, or even of variations in this temperature.

The real-time calculations of the vibrations permit fast reaction and make it possible to avoid a deterioration of the turbine which would be induced by a failure of a blade. These calculations are carried out on each blade, all the blades of a wheel being analyzed either in a single hub revolution or in a number of revolutions equal to the number of blades, a new blade being analyzed in each wheel revolution.

The device for optical measurement of vibration according to the invention has a wide passband and makes it possible to detect vibrations having resonant frequencies of between a few tens of hertz and a few hundreds of kilohertz. It is particularly suited to the measurement of vibrations of turbines of small and large satellite launchers and in particular it has been possible to demonstrate very high accuracy of measurement on a satellite launcher turbopump containing 108 blades for vibration frequencies of between 600 and 64000 hertz.

We claim:

1. A method for optically measuring vibrations in rotating turbine blades, each of said turbine blades being mounted on a hub integral with a shaft of a turbine wheel, each said blade comprising at least one flank disposed in a plane parallel to the midplane of said hub and a topside disposed in a plane parallel to the tangent plane of said hub, said turbine wheel moving with a specified speed of rotation, said method comprising the steps of:

generating three reference signals in response to the detection of the passing of a first marking made on said hub of the turbine wheel by a first optical detector;

detecting the passing of at least a third marking made on said topside of said blade, by a third optical detector and generating measurement signals in response thereto, said blade undergoing oscillation;

determining a plurality of time offsets between respective ones of each of said reference signals and each of said measurement signals, each said time offset being, in the absence of oscillations of said blade, equal to one of zero or a specified constant value; and calculating the amplitude, frequency and phase components of transverse and torsional blade vibrations from said plurality of time offsets.

2. A method for optically measuring vibrations in rotating turbine blades, each of said turbine blades being mounted on a hub integral with a shaft of a turbine wheel and each said blade comprising at least one flank disposed in a plane parallel to the midplane of said hub and a topside disposed in a plane parallel to a tangent plane of said hub, said turbine wheel moving with a specified speed of rotation and said turbine blades undergoing oscillation, said method comprising the steps of:

generating, with a first optical detector, three reference signals in response to detection of a passing of a first marking made on said hub of said turbine wheel;

detecting first measurement signals in response to passing of a second marking, made on said flank of each said blade, by a second optical detector;

detecting second measurement signals in response to passing of a third marking, made on said topside of each said blade, by a third optical detector;

determining a plurality of time offsets between a respective each of said reference signals and each of said measurement signals, each said time offset being, in the absence of oscillations of said turbine blades, equal to one of zero or a specified constant value; and calculating the amplitude, frequency and phase components of tangential transverse and torsional blade oscillations from said time offsets.

3. The method according to claim 2 wherein said second marking is made on said flank of each said blade in the form of three radially disposed equidistant marks, and wherein said second optical detector is a single sensor placed perpendicularly to the plane of said hub ahead of said blades.

4. The method of claim 2, wherein said second marking consists of a vertical edge of said blade, and said second optical detector comprises three equidistant optical sensors disposed ahead of said blades perpendicular to the plane of said hub.

5. The method claim 1 or claim 2, wherein said third marking made on said topside of each said blade comprises three parallel marks disposed obliquely with respect to the axis of said turbine wheel, and said third optical detector comprises a single radial optical sensor disposed in the midplane of said turbine wheel above said blade.

6. The method of claim 1 or claim 2, wherein said third marking made on said topside of said blade comprises three diamonds whose smallest diagonals are disposed in the midplane of said turbine wheel, and wherein said third optical detector comprises two sensors separated by a specified distance d and situated on either side of the midplane of said turbine wheel.

7. The method of claim 1 or claim 2, wherein said third marking made on said topside of said turbine blade comprises three parallel marks disposed parallel to the axis of said turbine wheel, and said third optical detector comprises a single radial sensor situated at a specified distance r from the midplane of said turbine wheel.

8. The method of claim 1 or claim 2, wherein said third marking made on said topside of said turbine blade comprises three parallel marks disposed parallel to the axis of said turbine wheel, and said third optical detector comprises two sensors separated by a specified distance d and situated on either side of the midplane of said turbine wheel.

9. The method of claim 1 or claim 2, said third marking made on said topside of said turbine blade comprises a single mark disposed on said topside of said turbine blade parallel to the axis of said turbine wheel, and said third optical detector comprises three equidistant radial sensors situated in a plane parallel to the midplane of said turbine wheel at a specified distance r from the plane of said turbine wheel.

10. The method of claim 1 or claim 2, wherein said third marking made on said topside of said turbine blade comprises three isosceles triangles whose bases are disposed parallel to the axis of said turbine wheel, and said third optical detector comprises two sensors separated by a specified distance d and situated on either side of the midplane of said turbine wheel.

11. The method of claim 1 or claim 2, wherein instantaneous measurement of the vibrations of said turbine blade is performed for each turbine blade of the turbine, all the turbine blades being analyzed in one turbine wheel revolution.

12. The method of claim 1 or claim 2, wherein instantaneous measurement of the vibrations of said turbine blade is performed for each turbine blade of the turbine, a different turbine blade being analyzed with each turbine wheel revolution.

13. The method of claim 1 or claim 2, further comprising the step of determining the spectrum of said vibrations of said blades by Fourier analysis of said values of said time offsets recorded over a predetermined number of turbine wheel revolutions.

14. The method of claim 13, further comprising the step of correcting measurement errors in said determination of said vibration of said turbine blade, which are due to a small axial displacement of said shaft of said turbine wheel, by evaluating an amplitude of said reference signals with respect to a specified amplitude corresponding to a nominal positioning of said shaft.

15. A device for the optical measurement of vibrations in rotating turbine blades, each of said blades being mounted on a hub integral with a shaft of a turbine wheel, each blade including at least one flank disposed in a plane parallel to the midplane of said hub and a topside disposed in a plane parallel to the tangent plane of said hub, said wheel moving with a specified speed and said blade undergoing oscillation, said device comprising:

a first measurement system for the generation of three reference signals in response to the detection, by a first optical detector, of the passing of a first marking made on said hub of said turbine wheel;

a second measurement system for the detection of three measurement signals in response to the passing of a second marking, made on said flank of said blade, by a second optical detector;

a third measurement system for the detection of a plurality of third measurement signals in response to the passing, a third optical detector, of a third marking made on said topside of said blade.

16. The device of claim 15, wherein said second marking comprises three equidistant marks disposed radially and said second optical detector comprises a single sensor placed perpendicularly to the plane of the hub ahead of the blades.

17. The device of claim 15, wherein said second marking includes a single radial mark and said second detector includes three equidistant sensors disposed perpendicularly to the plane of the hub, in an arc.

18. The device of claim 17, wherein said second marking includes a vertical edge of said blade.

19. A device for optically measuring vibrations in rotating turbine blades, said blades being mounted on a hub integral with a shaft of a turbine wheel, each of said blades comprising at least one flank disposed in a plane parallel to the midplane of said hub and a topside disposed in a plane parallel to the tangent plane of said hub, said turbine wheel moving with a specified speed, said device comprising:

a first measurement system for the generation of three reference signals in response to the detection, by a first optical detector, of the passing of a first marking made on said hub of said turbine wheel; and a third measurement system for for detecting measurement signals with the passing, in front of a third detector, of a third marking made on the topside of the blade, the blade undergoing oscillation.

20. The device of claim 15 or claim 19, wherein said first marking consists of three equidistant marks disposed radially and the said first detector includes a single sensor placed perpendicularly to the plane of the hub.

21. The device of claim 15 or claim 19, wherein said first marking consists of a single radial mark and the said first detector consists of three equidistant sensors disposed perpendicularly to the plane of the hub, according to an arc of a circle having the axis of the wheel as its centre.

22. The device of claim 15 or claim 19, wherein said third marking consists of three parallel marks disposed obliquely with respect to the axis of the wheel and the said third detector is a single radial sensor disposed in the midplane of the wheel, on top of the blade.

23. The device of claim 15 or claim 19, wherein said third marking consists of three marks in the form of diamonds whose smallest diagonals are disposed in the midplane of the wheel and the said third detector consists of two radial sensors situated, on top of the blade, on either side of the midplane of the wheel and separated by a distance d.

24. The device of claim 15 or claim 19, further including a fourth measurement system for the detection of three measurement signals upon passing, in front of a fourth detector, of a fourth marking made on the topside of the blade, the blade undergoing oscillation.

25. The device of claim 24, wherein said fourth marking consists of three parallel marks disposed parallel to the axis of the wheel and said fourth detector is a single radial sensor disposed at a distance r from the midplane of the wheel, on top of the blade.

26. The device of claim 24, wherein said fourth marking consists of three parallel marks disposed parallel to the axis of the wheel and said fourth detector consists of two radial sensors situated on either side of the midplane of the wheel and separated by a distance d.

27. The device of claim 15 or claim 19, wherein said third and fourth measurement systems include a single measurement system comprising a marking having three marks in the form of diamonds whose smallest diagonals are disposed in the midplane of the wheel and a detector consisting of two radial sensors situated, on top of the blade, on either side of the midplane of the wheel and separated by a distance d.

28. The device of claim 15 or claim 19, wherein the passing of a marking is detected by reflection of a light beam from a source in the corresponding detector.

29. The device of claim 15 or claim 19, detection of the passing of the edge of the blade is performed by occluding a light beam from a source and normally illuminating the corresponding detector.

30. The device of claim 28, further including a second optical fibre for conveying said light beam from said detector.

31. The device of claim 28, wherein said light beam is conveyed from said detector by a single optical fibre, and further including a beam splitter for routing on transmission and on reception.

32. The device of claim 30, further including a focusing lens disposed at the output of the optical fibre(s) for limiting dispersion of light exiting said optical fibre(s) to an area defined by the marking.

33. The device of claim 15 or claim 19, further including an opto-electronic acquisition module which transforms optical signals provided by the detectors into digital signals, and a signal processing module for processing said digital signals to determine the parameters of the vibrations in each mode.

34. The device of claim 33, wherein said acquisition module includes a feed module for generating the measurement light beam, a receiving module for receiving the reflected beam and a module for shaping electrical signals created by optical signals.

35. The device of claim 33, wherein said signal processing module includes a module for determining the speed of rotation of the turbine wheel from the reference signals received by the acquisition module, a time resetting circuit for accommodating initial offsets existing at the level of the measurement systems, and a real-time calculating unit which, from the measured time offsets provided by the acquisition module and realigned, calculates the parameters of the vibration which are its amplitude, frequency and phase in each mode.

36. The device of claim 29, wherein said detector is conveyed from the place of measurement by means of a second optical fiber.

37. The device of claim 34, wherein said signal processing module includes a module for determining the speed of rotation of the turbine wheel from the reference signals received by the acquisition module, a time resetting circuit for taking into account the initial offsets existing at the level of the measurement systems, and a real-time calculating unit which, from the measured time offsets provided by the acquisition module and realigned, calculates the parameters of the vibration which are its amplitude, frequency and phase in each mode.

* * * * *